United States Patent [19]
Dixon et al.

[11] Patent Number: 4,868,968
[45] Date of Patent: Sep. 26, 1989

[54] METHOD FOR ASSEMBLING BODY PANELS

[75] Inventors: James R. Dixon, Dexter; Derek F. Gentle, Birmingham; Adam M. Janotik, Grosse Ile; Lawrence P. Kazyak, Northville; Tahir M. Mansour, Livonia; Emmanuel P. Papadakis, Birmingham; Gordon G. Strosberg, Southfield, all of Mich.

[73] Assignee: Ford Motor Company, Dearborn, Mich.

[21] Appl. No.: 269,383

[22] Filed: Feb. 13, 1989

Related U.S. Application Data

[63] Continuation of Ser. No. 59,095, Jun. 8, 1987, abandoned.

[51] Int. Cl.⁴ .............................................. B23P 19/04
[52] U.S. Cl. ..................................... 29/460; 29/525.1; 264/263; 264/268; 296/187; 296/198; 296/35.1; 411/82; 411/175; 411/177; 411/182; 411/908
[58] Field of Search ................. 29/460, 525.1; 52/573; 264/263, 268; 296/31 P, 35.1, 187, 198; 411/82, 175, 177, 182, 908

[56] References Cited

U.S. PATENT DOCUMENTS

| | | | |
|---|---|---|---|
| 3,875,661 | 4/1975 | Lidstrom et al. | 296/31 P X |
| 4,325,178 | 4/1982 | Pruehs | 29/458 |
| 4,402,640 | 9/1983 | Peterson | 411/175 X |
| 4,438,971 | 3/1984 | Zaydel et al. | 29/525.1 |
| 4,497,516 | 2/1985 | Morita et al. | 411/182 X |
| 4,529,244 | 7/1985 | Zaydel | 296/31 P X |
| 4,573,733 | 3/1986 | Zaydel | 411/908 X |
| 4,597,153 | 7/1986 | Zaydel | 29/525.1 |
| 4,647,263 | 3/1987 | MacFee, Jr. et al. | 411/82 |

*Primary Examiner*—Timothy V. Eley
*Assistant Examiner*—Frances Chin
*Attorney, Agent, or Firm*—Daniel M. Stock; Clifford L. Sadler

[57] ABSTRACT

A method and apparatus for the attachment of plastic outer body panels to automotive vehicle subframes including positioning a cup within apertures in the subframe, applying a thixotropic heat curable plastic/adhesive to the cup, heat curing the plastic/adhesive in situ while forming a blind aperture in the plastic/adhesive, and securing the body panel to the subframe through threaded insertion of a fastener into the blind aperture.

8 Claims, 2 Drawing Sheets

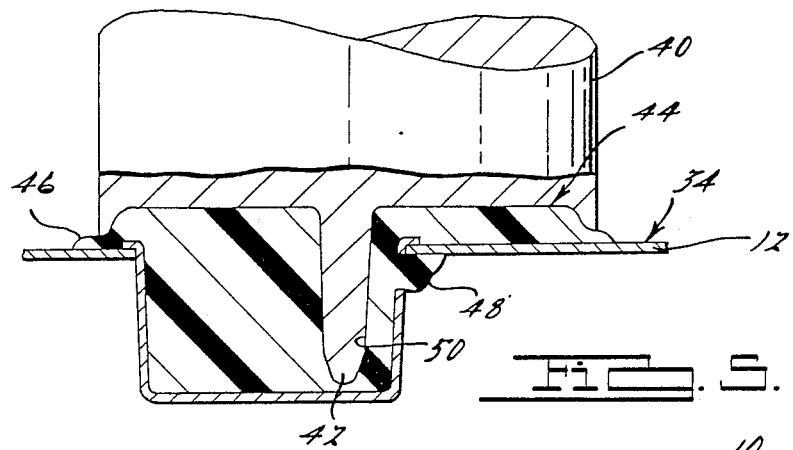
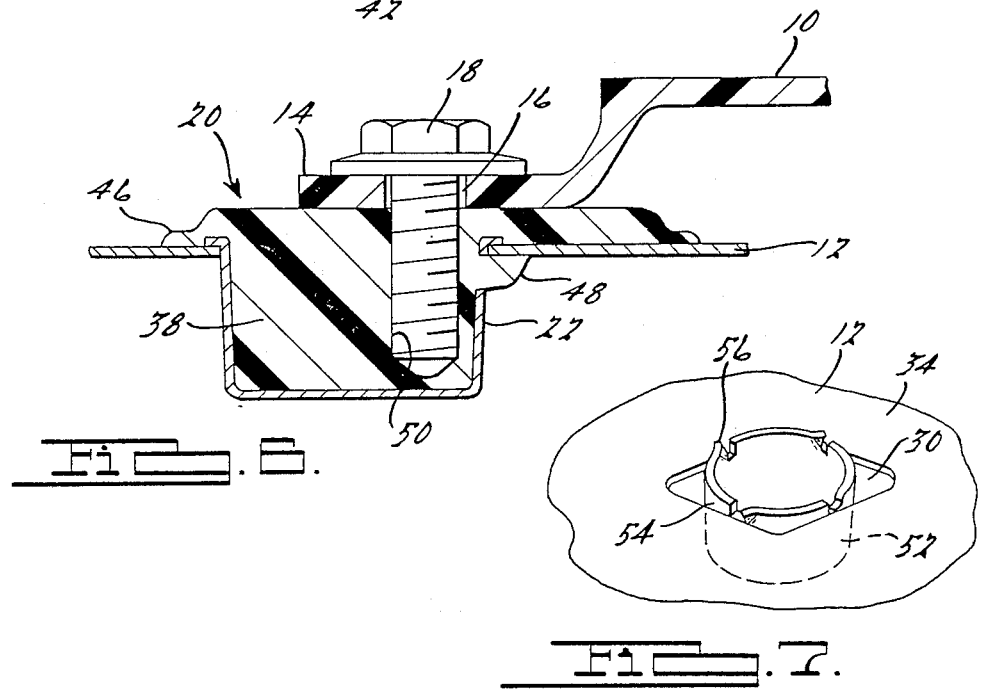
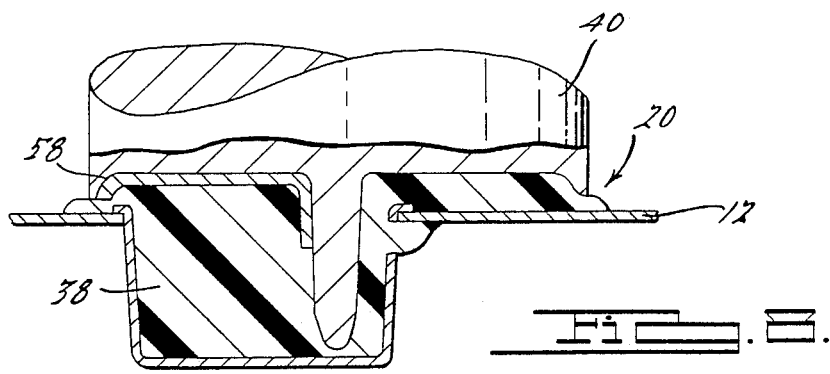

METHOD FOR ASSEMBLING BODY PANELS

This is a continuation of application Ser. No. 59,095, filed June 8, 1987 now abandoned.

BACKGROUND OF THE INVENTION

The invention relates to the attachment of outer body panels to automotive vehicle structure and particularly to the attachment of such panels fabricated from plastic in a manner which assures proper fit of the panels with respect to each other and to the substructure free from distortion during assembly.

DESCRIPTION OF THE PRIOR ART

It has been conventional in the automotive industry to fabricate automotive vehicle bodies through the welding or bolting of a plurality of metal panels to a metallic substructure or subframe. The substructure is non-decorative and cooperates with the outwardly facing body panels, both to support the decorative outer body panels and to combine to reinforce them and together carry the loads required in the vehicle application.

Of relatively recent practice in the automotive industry is the use of plastic in fabricating some or all of the external body panels. The fastening of the plastic outer body panels to a metallic inner structural substructure has presented a significant problem to the automotive industry. The plastic cannot be welded to the metal and conventional fastening techniques run the risk of distortion of the plastic body panel near the point of attachment This is generally unacceptable owing to their function as decorative outer body parts.

Solutions to this problem that have been advanced in the automotive industry have generally employed an intermediate plastic structure positioned between the plastic outer body panel and the metal substructure. The intermediate plastic structure has been machined to assure proper location with respect to the metallic substructure and the inner surface of the body panel and has been drilled to receive a threaded fastener. Exemplary of such prior art solutions are those shown in U.S. Pat. Nos. 4,438,971, Zaydel et al, 4,529,244, Zaydel, and 4,573,733, Zaydel, and 4,597,153, Zaydel.

While these solutions have been found to be generally appropriate responsive to the performance problems stated; that is, they can be used to permit effective distortion-free assembly of plastic body panels on the metal substructure, they likewise presented significant economic problems in terms of the costs incurred in assuring the quality of the finished product because of its dependence upon the accurate machining of the intermediate plastic structure and the accurate positioning of the drilling into that intermediate plastic structure. The machining and drilling tend to be relatively slow processes, particularly when the attendant needs for chip removal and part cleaning are included in the overall process time.

SUMMARY OF THE INVENTION

Responsive to these deficiencies in the prior art and to the need for the automotive industry to devise acceptable methods and apparati for assembling plastic body panels to metal substructures, applicants have in their present invention provided an assembly system in which a flanged cup is inserted into a hole in the metal subframe and a heat curing thixotropic plastic/adhesive is applied into the recess of the cup whereupon an appropriately configured heated fixture is brought into contact with the plastic/adhesive to mold the adhesive to a predetermined height above the metallic subframe. The heated fixture simultaneously heat cures the plastic/adhesive and forms a fastener receiving aperture extending from its outer face into the cup area. This process effects the manufacture of an intermediate plastic structure for properly positioning the plastic outer body panel with respect to the metal subframe without costly and time consuming intermediate machining steps.

Applicants have also optimized the manufacturing efficiency of the disclosed assembly process through devising configurations for the inserted cup and the mating body panel apertures to enhance their cooperation to bear the required assembly and functional loadings. In the preferred embodiments the metallic subframe aperture is generally non-circular and the cup is configured to define a generally circular flanged configuration which is sized to permit and enhance overflow of plastic/adhesive to effect a bond between the cup and the metallic subframe. A specific structure is also included with the cup in certain embodiments to enhance the structural connection between the cup and the metallic subframe.

According to another feature of the invention, a thread engaging insert, preferably of metal, may be introduced into the plastic/adhesive adjacent the fastener receiving aperture formed during the heating and curing process to increase the retention capacity of the fastener used to secure the plastic body panel.

BRIEF DESCRIPTION OF THE DRAWINGS

These and other features and additional objects of the invention will occur to those skilled in the body art on reading the following description with reference to the accompanying drawings in which:

FIG. 5 is a cross-sectional view showing the contact of the heated fixture with the plastic/adhesive filled cup;

FIG. 6 is a cross-sectional view of a plastic automotive body panel to the vehicle subframe through the plastic/adhesive structure there formed;

FIG. 7 is a perspective view of an alternative configuration of the cup of the present invention; and FIG. 8 is a cross-sectional view similar to FIG. 5 illustrating an alternative configuration in which a metallic insert is added to the intermediate plastic/adhesive structure.

DESCRIPTION OF THE PREFERRED EMBODIMENTS

Figure 1:
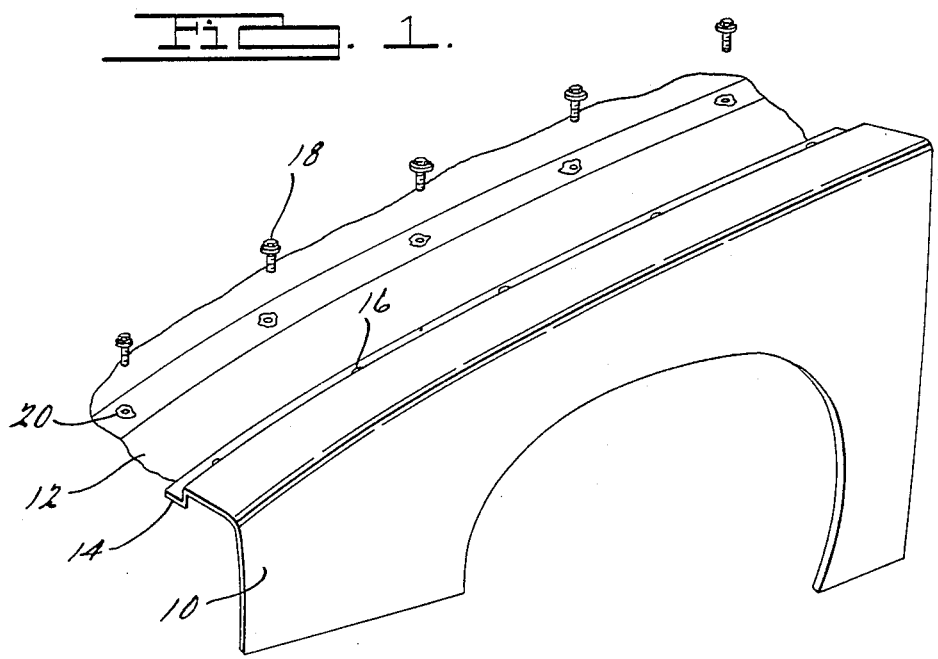
FIG. 1 is a perspective exploded view of an automobile fender as it is installed on a metallic subframe.

Turning now to the drawings, and in particular to FIG. 1 thereof, a plastic fender panel 10 is illustrated as it is positioned to be installed on a metallic subframe 12 of an automotive body. A flanged portion 14 of the fender 10 is pierced by clearance hole 16 allowing the passage of threaded fasteners, such as bolts 18, received in the metallic subframe 12 In registration with clearance holes 16 is the positioning and fastening apparatus 20 formed and assembled according to the present invention.

Figure 2:
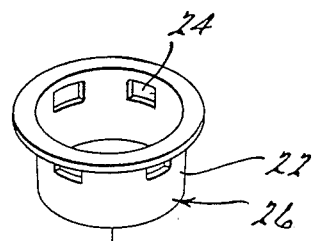
FIG. 2 is an exploded perspective view of a flanged cup as it is inserted into the automobile subframe according to the present invention.

A preferred assembly method according to the present invention is best illustrated in FIGS. 2-6. In FIG. 2 a flanged cup 22, which may be fabricated of either plastic or metal and which may include apertures 24 formed through its sidewalls 26, is illustrated as it is positioned to be inserted into a generally square aperture 28 having rounded corners 30.

Figure 3:
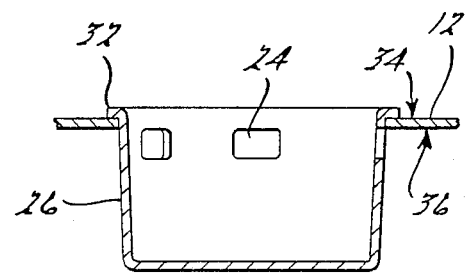
FIG. 3 is a cross-sectional view of the cup installed.

As is illustrated in FIG. 3, the cup 22 is inserted into the aperture 28 until portions of the flanged portion 32 of the cup abut the outer surface 34 of the metallic subframe 12. It should be noted that the apertures 24 through sidewalls 26 of cup 22 are positioned to open below the lower surface 36 of the metallic subframe 12. The insertion to this position may be effected either manually or through robotic manipulation. It will be appreciated by those skilled in the automotive assembly arts that the remaining steps in the assembly method of the present invention are likewise adaptable to either manual or robotic performance.

Figure 4:
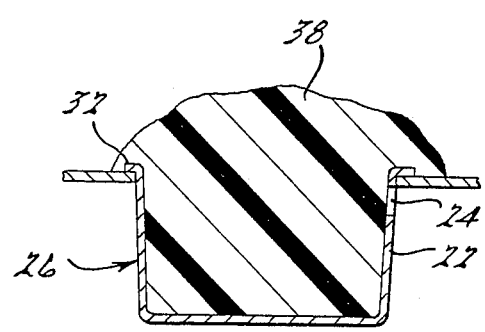
FIG. 4 is a cross-sectional view of the cup in which plastic/adhesive is applied.

In FIG. 4 there is illustrated the application of the heat curing thixotropic plastic/adhesive indicated at 38 to the cup 22. It is to be noted that the plastic/adhesive 38 more than fills the cup 22 spilling out and surrounding the flanged portion 32 of the cup 22.

Next, as is shown in FIG. 5, a fixture having a heated outer portion, as indicated at 40 is brought into contact with the plastic/adhesive 38. The fixture 40 includes a tapered pin portion indicated at 42 which pierces into the plastic/adhesive 38. In the process of assembling the plastic automotive body panels such as the fender 10 of FIG. 1, a plurality of devices such as illustrated in FIG. 5 may be employed in unison, fixtured together to provide proper geometry to ensure the proper alignment of the exterior body panel to other portions of the automotive body defined by the metallic subframe 12. Of critical importance at each position, however, is the spacing of the outer surface of the plastic/adhesive 38 formed by the fixture 40 as indicated at 44 in FIG. 5 from the outer surface 45 of the metallic subframe 12. The plastic/adhesive 38 is heat cured by contact with the heated fixture 40 and thus the position of the surface 44 is established by the position of the fixture 40. As is illustrated in FIG. 5, excess portions as indicated at 46, 48 of the plastic/adhesive 38 migrate outwardly from the area of the plastic/adhesive 38 covered by the fixture 40 to contact portions of the metallic subframe 12. While the cup 22 is sized to closely engage inner surfaces of the aperture 30 in the metallic subframe 12, the mechanical fixing of the cup 22 with respect to the subframe 12 is enhanced by the adhesive bond effected by the overflow portions 46, 48.

After withdrawal of fixture 40, the flanged portion 14 of the fender 10 may be brought into contact with the contnrolled surface 44 of the positioning and fastening apparatus 20 of the present invention, as indicated in FIG. 6. The clearance holes 16 through the flanged portion 14 are brought into registration with the recess 50 formed by the tapered pin portion 42 of the fixture 40 during the heating and curing step illustrated in FIG. 5. Threaded fasteners 18, which may be of the self-tapping variety, may then be inserted through the clearance hole 16 to threadedly engage in the tapered aperture 50 formed in the plastic/adhesive 38. An accurately positioned and economically formed connection between the plastic outer body panel such as the fender 10 and the metallic subframe 12 is thus formed.

In one alternative form of the cup 22, as illustrated in FIG. 7, a cup 52 is formed without a flange as was illustrated with respect to the cup 22. The interaction of the cup 52 with the aperture 30 in the metallic subframe 12 is effected for cups formed of a metallic material through the outstriking of the open end of the walls 54 at a plurality of locations to form tabs 56 which may function both to engage the upper surface 34 of the metallic subframe 12 adjacent the aperture 30 in a manner similar to the flanged portion 32 of the cup 22 of the first described preferred embodiment and may serve to resist rotation of the cup 52 within the aperture 30.

For certain uses of the assembly method and apparatus of the present invention, higher resistance to pullout or higher degrees of retention of the threaded fasteners, such as that depicted at 18 may be desirable than that afforded by the interaction of the threaded fastener 18 and the plastic/adhesive 38 alone. In such applications, a metallic insert as indicated at 58 may be applied to portions of the upper surface 44 of the positioning and fastening device 20 as is illustrated in FIG. 8. The fixture 40 may be modified to carry the insert 58 during its being brought into contact with the plastic/adhesive 38.

While only certain embodiments of the method and apparati of the present invention have been shown and described, others may be possible without departing from the scope of the following claims.

We claim:

1. A method of assembling plastic body panels to a metallic subframe of an automotive vehicle, the method comprising:
   forming substantially rectangular apertures in the metallic subframe;
   inserting a flanged cylindrical cup member into said aperture;
   applying a heat curable plastic/adhesive to the cup;
   contacting said plastic/adhesive with a heated die to simultaneously form a blind tapered hole in the plastic/adhesive to define a spacing of an outer surface of the plastic/adhesive with respect to the metallic subframe, and heat curing the adhesive;
   forming an aperture in the body panel;
   positioning the body panel in abutting relationship with the spaced surface of the plastic/adhesive to effect registration of the body panel aperture with the plastic/adhesive hole; and
   securing said body panel to said subframe by threadedly engaging a self-tapping fastener into the plastic/adhesive through the body panel aperture.

2. A method as defined in claim 1, and further comprising a step of forming locking tabs on said cup to restrict rotation of said cup with respect to said subframe.

3. A method as defined in claim 1, and further comprising the step of inserting a metallic retainer into said plastic/adhesive adjacent said tapered blind aperture during said heating/curing step.

4. A method as defined in claim 1, wherein a plurality of apertures are formed in said metallic subframe and said method is duplicated simultaneously at each of the apertures prior to said positioning step.

5. A method of assembling plastic body panels to a metallic subframe of an automotive vehicle, the method comprising:

forming substantially rectangular apertures in the metallic subframe;

inserting a flanged cylindrical cup member into said aperture;

applying a thixotropic plastic/adhesive to the cup;

contacting said plastic/adhesive with a heated die to simultaneously form a blind tapered hole in the plastic/adhesive to define a spacing of an outer surface of the plastic/adhesive with respect to the metallic subframe, and heat curing the adhesive;

forming an aperture in the body panel;

positioning the body panel in abutting relationship with the spaced surface of the plastic/adhesive to effect registration of the body panel aperture with the plastic/adhesive blind hole; and securing said body panel to said subframe by threadedly engaging a self-tapping fastener into the plastic/adhesive through the body panel aperture.

6. A method as defined in claim 5, and further comprising a step of forming locking tabs on said cup to restrict rotation of said cup with respect to said subframe.

7. A method as defined in claim 5, and further comprising the step of inserting a metallic retainer into said plastic/adhesive adjacent said blind tapered hole during said heating/curing step.

8. A method as defined in claim 5, wherein a plurality of apertures are formed in said metallic subframe and said method is duplicated simultaneously at each of the apertures prior to said positioning step.

* * * * *